(12) United States Patent
Poerschke et al.

(10) Patent No.: US 12,298,028 B2
(45) Date of Patent: May 13, 2025

(54) FITTING AND FERRULE FOR CONNECTING TO FLEXIBLE DUCT

(71) Applicant: RHEIA, LLC, Pittsburgh, PA (US)

(72) Inventors: Andrew Poerschke, Pittsburgh, PA (US); Robert Beach, Pittsburgh, PA (US); Nigel Watts, Bradford Woods, PA (US)

(73) Assignees: RHEIA, LLC, Phoenix, AZ (US); Carrier Corporation, Palm Beach Gardens, FL (US)

( * ) Notice: Subject to any disclaimer, the term of this patent is extended or adjusted under 35 U.S.C. 154(b) by 617 days.

(21) Appl. No.: 16/788,772

(22) Filed: Feb. 12, 2020

(65) Prior Publication Data
US 2021/0247098 A1    Aug. 12, 2021

(51) Int. Cl.
*F24F 13/02*    (2006.01)
*F16L 33/24*    (2006.01)

(52) U.S. Cl.
CPC .......... *F24F 13/0218* (2013.01); *F16L 33/24* (2013.01); *F24F 13/0209* (2013.01)

(58) Field of Classification Search
CPC ..... F24F 13/0218; F24F 13/0209; F16L 33/24
See application file for complete search history.

(56) References Cited

U.S. PATENT DOCUMENTS

| | | | |
|---|---|---|---|
| 2,475,322 A * | 7/1949 | Horton | H02G 3/0616 285/391 |
| 2,918,314 A | 12/1959 | Kemnitz | |
| 3,393,267 A * | 7/1968 | Busse | F16L 33/26 285/390 |
| 3,408,099 A | 10/1968 | Appleton | |
| 3,596,936 A | 8/1971 | Dieckmann et al. | |
| 4,082,327 A | 4/1978 | Sting et al. | |
| 4,099,747 A | 7/1978 | Meserole | |
| 4,169,967 A | 10/1979 | Bachle | |

(Continued)

FOREIGN PATENT DOCUMENTS

| | | |
|---|---|---|
| DE | 1747267 U | 6/1957 |
| DE | 4443005 A1 | 6/1995 |

(Continued)

OTHER PUBLICATIONS

English Translation of the Specification for DE4443005A1.*

(Continued)

*Primary Examiner* — James M Hewitt, II
(74) *Attorney, Agent, or Firm* — The Webb Law Firm

(57) ABSTRACT

A fitting assembly for connection to a flexible duct includes a fitting and a ferrule extending from the fitting. The ferrule includes a first end configured for insertion into an open end of the flexible duct, a second end adjacent to the fitting, and a sidewall extending between the first end and the second end. The sidewall defines a minor diameter adjacent the first end and a major diameter spaced apart from the minor diameter. The ferrule further includes a ferrule thread extending radially outward from the sidewall. The minor diameter is less than or equal to an inner diameter of the flexible duct with the flexible duct fully elongated, and the major diameter is greater than the inner diameter of the flexible duct with the flexible duct fully elongated.

12 Claims, 6 Drawing Sheets

(56) References Cited

U.S. PATENT DOCUMENTS

| | | | |
|---|---|---|---|
| 4,174,858 A * | 11/1979 | Brooks | A47L 9/242 |
| | | | 285/239 |
| 4,286,808 A | 9/1981 | Fouss et al. | |
| 4,369,992 A | 1/1983 | Fournier et al. | |
| 4,418,943 A | 12/1983 | Ionna | |
| 4,457,544 A | 7/1984 | Snow et al. | |
| 4,629,827 A * | 12/1986 | Baxter | B29C 48/34 |
| | | | 174/136 |
| 4,708,370 A | 11/1987 | Todd | |
| 4,930,815 A | 6/1990 | Tuggler, Jr. | |
| 4,941,084 A | 7/1990 | Terada et al. | |
| 4,941,783 A | 7/1990 | Maier | |
| 5,087,084 A | 2/1992 | Gehring | |
| 5,346,264 A * | 9/1994 | Law | F16L 25/0045 |
| | | | 285/903 |
| 6,273,145 B1 | 8/2001 | Botting | |
| 6,585,297 B2 * | 7/2003 | Mullen, Jr. | H02G 3/0691 |
| | | | 285/251 |
| 6,767,280 B1 | 7/2004 | Berger | |
| 7,393,021 B1 | 7/2008 | Lukjan | |
| 2010/0244438 A1 | 9/2010 | Johanson | |
| 2013/0331022 A1 | 12/2013 | Sandman et al. | |
| 2014/0049043 A1 | 2/2014 | Hamman, Jr. et al. | |

FOREIGN PATENT DOCUMENTS

| | | |
|---|---|---|
| FR | 3033032 A1 | 8/2016 |
| FR | 3057339 A1 | 4/2018 |
| GB | 2259342 A | 3/1993 |
| WO | 2011066612 A1 | 6/2011 |
| WO | 2018004768 A1 | 1/2018 |

OTHER PUBLICATIONS

European Supplemental Search Report dated Aug. 8, 2023, European Patent Application No. 21754572.2.

European Supplemental Search Report dated Aug. 8, 2023, European Patent Application No. 21766826.8.

* cited by examiner

FITTING AND FERRULE FOR CONNECTING TO FLEXIBLE DUCT

BACKGROUND

Field

The present disclosure generally relates to fittings for connecting flexible ducts in heating, ventilation, and air conditioning (HVAC) applications. More specifically, the present disclosure is related to a fitting assembly, a ferrule, a ductwork assembly, and a method of connecting a flexible duct to a fitting and/or ferrule.

Description of the Related Art

Non-rigid ducting is widely used in residential and commercial HVAC applications to economically install long sections of ductwork in substantially straight lines or large-radius curves. However, rigid fittings must be used where tight curves are required or where the ducting connects to other components of the HVAC system. Conventionally, such rigid fittings are made of sheet metal and require the use of mastic and/or mechanical fasteners to ensure a solid and air-tight seal with the ducting, adding labor and material expense to the installation process. This is largely due to the inconsistency of sheet metal fittings, and their inherently leaky stamped construction. Moreover, spreading or spraying mastic on all sides of ductwork is challenging as the ductwork is often installed in tight chases and cavities with no access to the obscured side. Additionally, because of the sharp edges and design of conventional sheet metal fittings, it is often difficult to stretch ductwork over the fitting. Exacerbating these issues is that the large diameter of conventional ducting makes it difficult to hold both the ducting and the fitting when making the necessary connections. Once the ducting is stretched over the fitting, the installer must attach zip ties and screws while working against the tension of the duct. Often this requires several tries from the installer to finish the connection. Additionally, because the connection generally must be made while the ducting is under tension, it is difficult to properly stretch the duct to length as the ducting inherently pulls itself back to its natural state.

SUMMARY

In view of the foregoing, there exists a need for ductwork assemblies, components thereof, and methods of assembling a ductwork assembly that simplify the process of installing ductwork.

Embodiments of the present disclosure are directed to a fitting assembly for connection to a flexible duct. The fitting assembly may include a fitting and a ferrule extending from the fitting. The ferrule may include a first end configured for insertion into an open end of the flexible duct; a second end adjacent to the fitting; a sidewall extending between the first end and the second end, the sidewall defining a minor diameter adjacent the first end and a major diameter spaced apart from the minor diameter; and a ferrule thread extending radially outward from the sidewall. The minor diameter may be less than or equal to an inner diameter of the flexible duct with the flexible duct fully elongated, and the major diameter may be greater than the inner diameter of the flexible duct with the flexible duct fully elongated.

In some embodiments, the ferrule is removeably connected to the fitting.

In some embodiments, the ferrule is integrally formed with the fitting.

In some embodiments, a taper of the sidewall of the ferrule is configured to stretch a sheet material of the flexible duct as the ferrule is threaded into the flexible duct.

In some embodiments, a pitch of the ferrule thread is less than or equal to a pitch of a helix structure of the flexible duct with the flexible duct fully elongated.

In some embodiments, an outer diameter of the ferrule thread is larger than an inner diameter of a helix structure of the flexible duct when a pitch of the ferrule thread is equal to a pitch of the helix structure.

In some embodiments, the length of the sidewall between the major diameter and the minor diameter is sufficient for the ferrule to engage at least one revolution of a helix structure of the flexible duct.

In some embodiments, the connection between the fitting and the ferrule is substantially air tight without application of a sealant material.

In some embodiments, the fitting assembly may further include a gasket or sealant material disposed at an interface of the fitting and the ferrule.

In some embodiments, the ferrule thread includes at least one full revolution around the sidewall of the ferrule.

In some embodiments, the ferrule is rotatable relative to the fitting.

In some embodiments, the ferrule is continuously rotatable relative to the fitting.

In some embodiments, one of the fitting and the ferrule defines a groove, and another of the fitting and the ferrule includes at least one deflectable tab configured to engage the groove to removeably connect the fitting to the ferrule.

In some embodiments, the at least one deflectable tab includes a projection configured to snap into the groove.

In some embodiments, the fitting includes at least one of an elbow, a tee, a wye, a manifold takeoff, a coupling, a terminal boot, a cap, a plug, a union, and a flange.

Other embodiments of the present disclosure are directed to a ferrule for connecting to a flexible duct. The ferrule may include a first end configured for insertion into an open end of the flexible duct; a second end configured for removeable connection to a fitting; a sidewall extending between the first end and the second end, the sidewall defining a minor diameter adjacent the first end and a major diameter spaced apart from the minor diameter; and a ferrule thread extending radially outward from the sidewall. The minor diameter may be less than or equal to an inner diameter of the flexible duct with the flexible duct fully elongated. The major diameter may be greater than the inner diameter of the flexible duct with the flexible duct fully elongated.

In some embodiments, a taper of the sidewall of the ferrule is configured to stretch a sheet material of the flexible duct as the ferrule is threaded into the flexible duct.

In some embodiments, a pitch of the ferrule thread is less than or equal to a pitch of a helix structure of the flexible duct with the flexible duct fully elongated.

In some embodiments, an outer diameter of the ferrule thread is larger than an inner diameter of a helix structure of the flexible duct when a pitch of the ferrule thread is equal to a pitch of the helix structure.

In some embodiments, the length of the sidewall between the major diameter and the minor diameter is sufficient for the ferrule to engage at least one revolution of a helix structure of the flexible duct.

In some embodiments, the ferrule thread includes at least one full revolution around the sidewall.

In some embodiments, the ferrule may further include at least one deflectable tab configured to engage a groove of the fitting, and a groove configured to receive at least one deflectable tab of the fitting.

Other embodiments of the present disclosure are directed to a ductwork assembly including a duct having a helix structure and a flexible sheet material surrounding the helix structure; a ferrule including a first end and a second end; a sidewall extending between the first end and the second end, the sidewall defining a minor diameter adjacent the first end and a major diameter spaced apart from the minor diameter; and a ferrule thread extending radially outward from the sidewall. The minor diameter may be less than or equal to an inner diameter of the duct with the flexible duct fully elongated, and the major diameter may be greater than the inner diameter of the duct with the flexible duct fully elongated. The helix structure of the duct may be threaded over the ferrule thread such that the flexible sheet material of the duct is stretched radially outward by the sidewall of the ferrule.

In some embodiments, the ductwork assembly may further include a fitting removeably connected to or integrally formed with the second end of the ferrule.

Other embodiments of the present disclosure are directed to a method of assembling ductwork. The method may include providing a duct having a helix structure and a flexible sheet material surrounding the helix structure; providing a ferrule having a sidewall extending between a first end and a second end, and a ferrule thread extending radially outward from the sidewall, the sidewall defining a minor diameter adjacent the first end and a major diameter spaced apart from the minor diameter, wherein the minor diameter is less than or equal to an inner diameter of the duct and wherein the major diameter is greater than the inner diameter of the duct; and threading the helix structure of the duct over the ferrule thread such that the flexible sheet material of the duct is stretched radially outward by the sidewall of the ferrule.

In some embodiments, a method may further include connecting a fitting to the second end of the ferrule.

In some embodiments threading the helix structure of the duct over the ferrule shortens a pitch of the helix structure.

Further details and advantages of the present disclosure will be understood from the following detailed description read in conjunction with the accompanying drawings.

DETAILED DESCRIPTION

Figure 1:
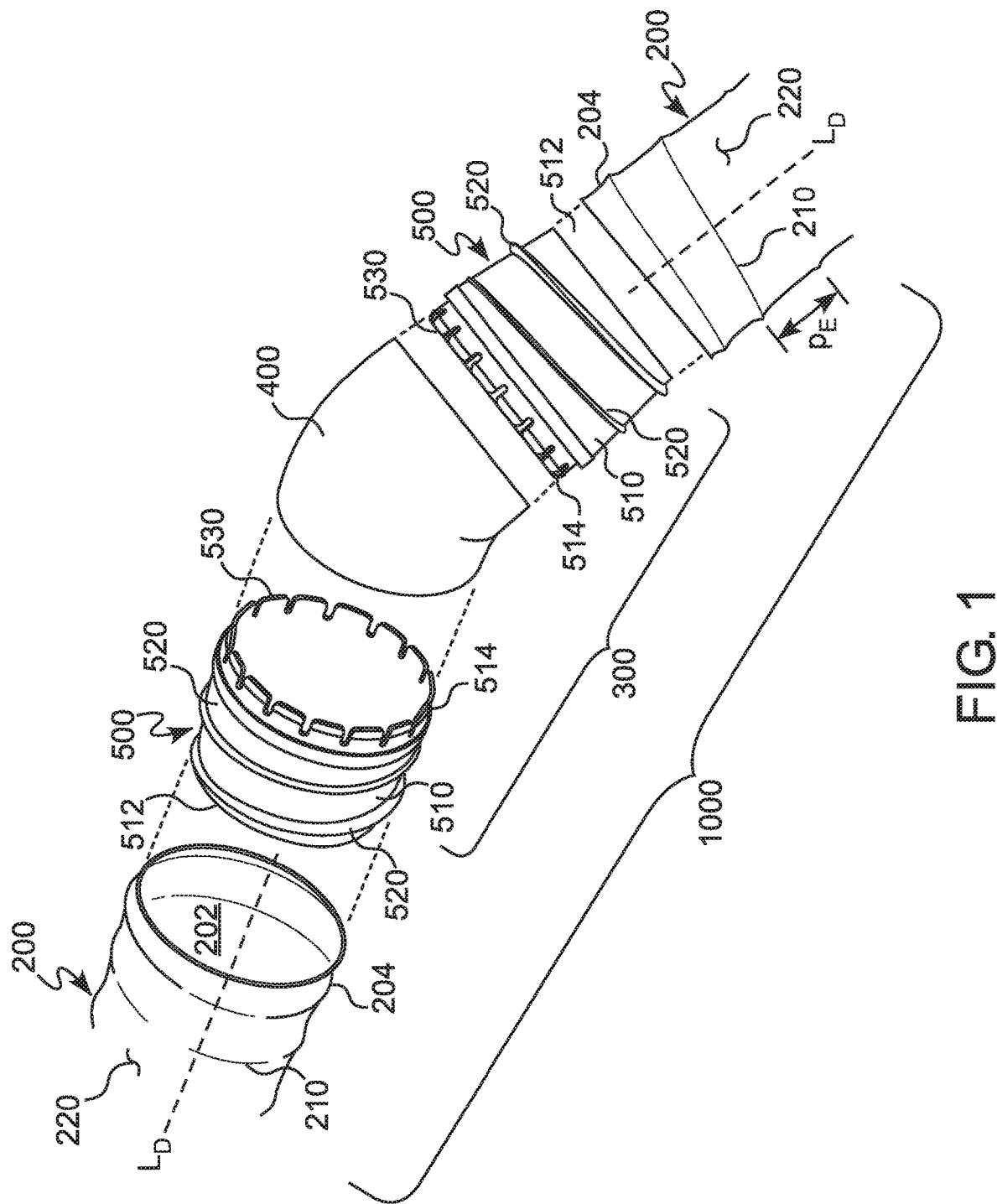
FIG. 1 is an exploded perspective view of a ductwork assembly in accordance with embodiments of the present disclosure.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

All numbers used in the specification and claims are to be understood as being modified in all instances by the term "about". The terms "approximately", "about", and "substantially" mean a range of plus or minus ten percent of the stated value. Ranges of values are to be understood as being inclusive unless specified to the contrary.

As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F.

As used herein, the term "flexible duct" means a non-rigid, elongate hollow structure suitable for the conveyance of fluid such as air. As will be described in greater detail herein, embodiments of the flexible duct may be radially and/or axially deformable. The flexible duct may be transitionable between several physical states in response to axial and/or radial loading. A relaxed or natural state of the flexible duct refers to a state assumed by the flexible duct when no axial or radial load is applied. An elongated, tensioned, or pretensioned state of the flexible duct refers to a state in which at least a portion of the duct is axially extended to be longer than the relaxed state. The elongated, tensioned, or pretensioned state may be assumed by the flexible duct in response to an axial and/or radial load. A compressed state of the flexible duct refers to a state in which at least a portion of the duct is axially compressed to be shorter than the relaxed state. The compressed state may be assumed by the flexible duct in response to an axial and/or radial load. In some embodiments, the relaxed or natural state of the flexible duct may also correspond to the maximum extended length of the flexible duct, in which case the elongated state of the flexible duct would be the same as the natural state. In some embodiments, the flexible duct may be in the elongated, tensioned, or pretensioned state when the flexible duct is installed in a ductwork system. The flexible duct may be un-insulated, or have a thermally insulating layer surrounding the inner air conduit.

As used herein, the term "air tight", when used to define an interface or connection between two or more members, means that a total volume of air that leaks from the interface in one hour is less than 20 times the volume of a test sample which includes 8 feet of duct connected to the interface and pressurized to 124.5 Pa.

Referring now to the drawings, in which like reference characters refer to like parts throughout the several views thereof, various embodiments of a fitting assembly, a ferrule, and a ductwork assembly are shown. Referring now to FIG. 1, a ductwork assembly 1000 is illustrated which includes at least one flexible duct 200 connected to a fitting assembly 300 which includes a fitting 400 and at least one ferrule 500. The fitting assembly 300 may be used to join sections of flexible duct 200 in the ductwork assembly 1000. The ductwork assembly 1000 may form a part of a residential or commercial HVAC system or other fluid distribution system. For example, the ductwork assembly 1000 may convey air from a furnace, heat pump, or air conditioner to a register. The ductwork assembly 1000 shown in FIG. 1 is only a portion of an HVAC system which may include a plurality of flexible ducts 200, fitting assemblies 300, and other components such as registers, furnaces, heat pumps, air conditioners, humidifiers, fans, other air-consuming appliances, and the like. Additional details of an HVAC system in which the ductwork assembly 1000 may be utilized is described in International Patent Application Publication No. WO 2018/004768, the disclosure of which is hereby incorporated by reference in its entirety.

As may be appreciated from FIG. 1, the flexible duct 200 extends along a longitudinal axis $L_D$ and defines a hollow interior 202 suitable for the conveyance of fluid such as air. In particular, a sidewall of the flexible duct 200 is formed of a flexible sheet material 220 which extends along the longitudinal axis $L_D$ and surrounds the hollow interior 202. The flexible duct 200 may have a generally circular in cross section and, at least in the relaxed state, has substantially continuous inner and outer diameters along the longitudinal axis $L_D$. In some embodiments, the flexible duct 200 includes a resilient helix structure 210 embedded in, surrounding, or surrounded by the flexible sheet material 220. In the embodiment shown in the drawings, the helix structure 210 includes a helical wire. In other embodiments, the helix structure 210 may include a helical crimp extended around an outer surface of the flexible sheet material 220 and crimping or pinching a portion of the flexible sheet material 220 along the path of the helical crimp. In some embodiments, the flexible duct 200 may include multiple helix structures 210, though for the purposes of this disclosure a single helix structure 210 will be assumed for simplicity. The helix structure 210 is resiliently deformable and includes a plurality of continuous windings or revolutions.

Figure 2:
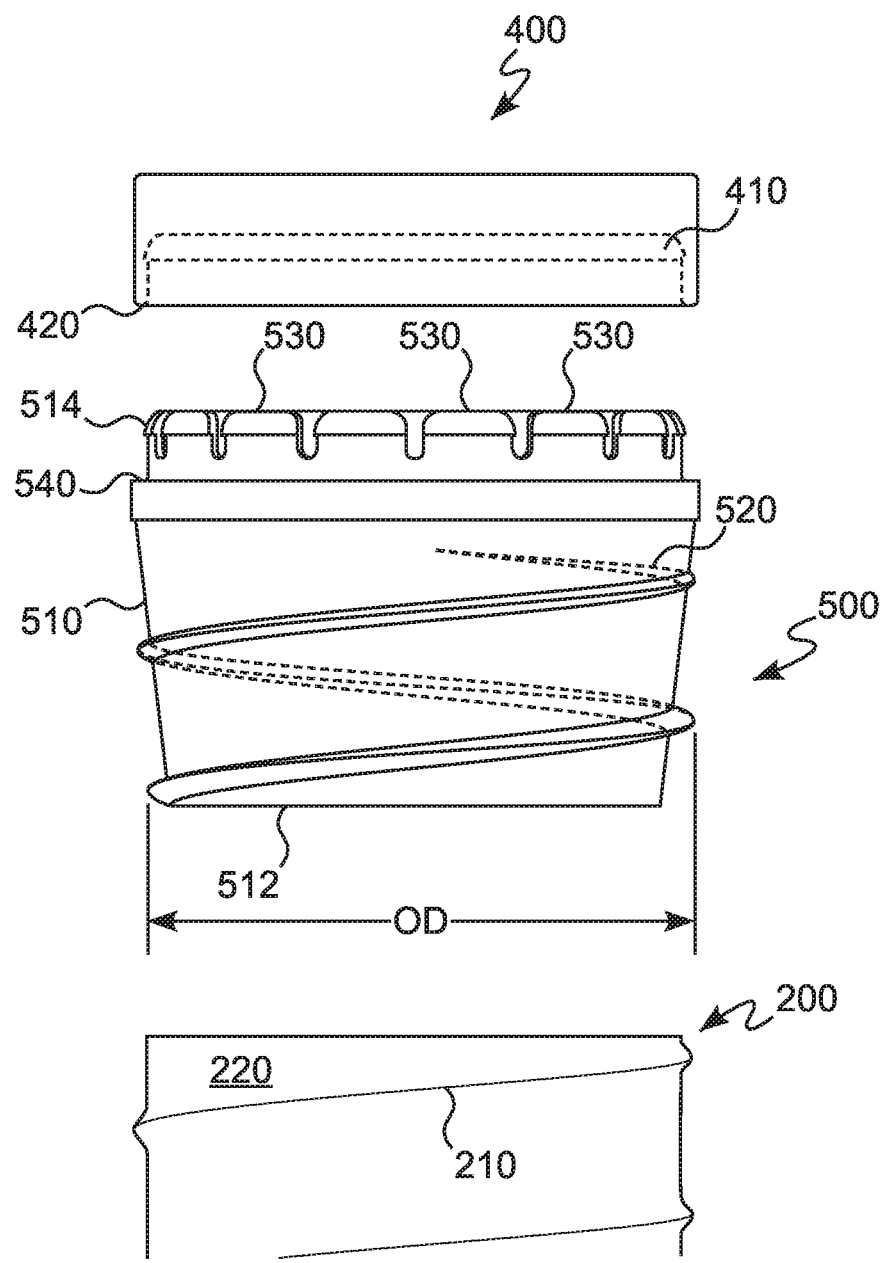
FIG. 2 is an exploded side view of the ductwork assembly of FIG. 1.
Figure 3:
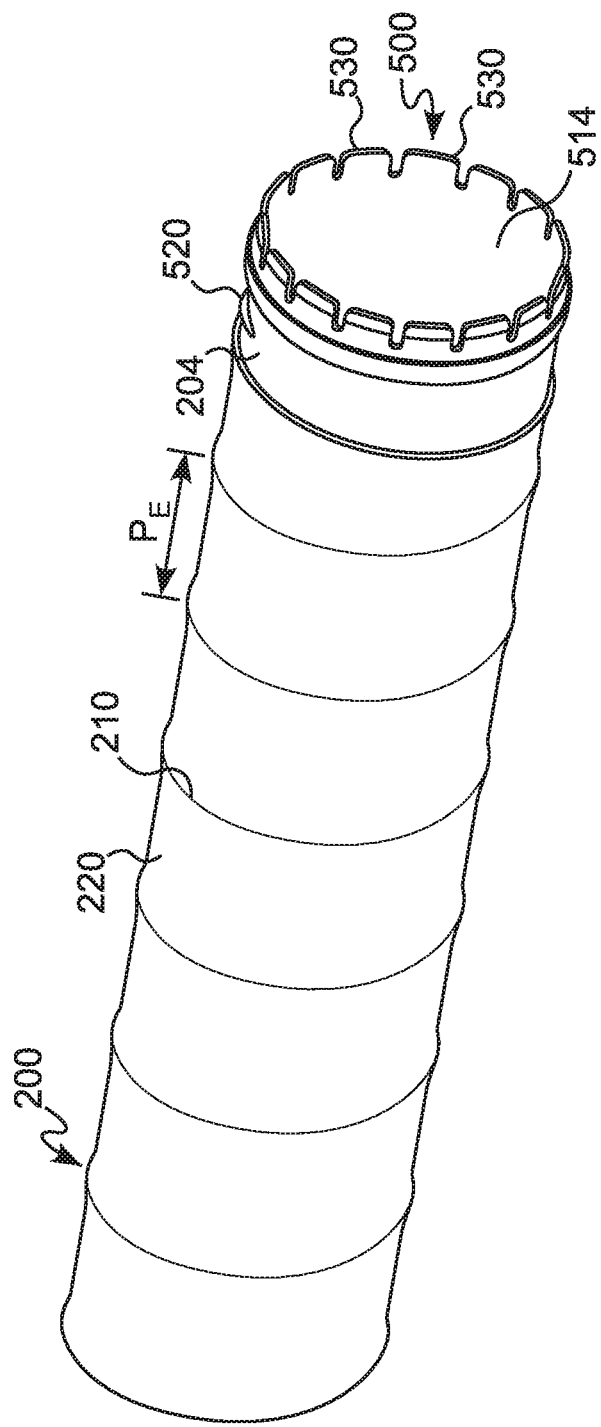
FIG. 3 is a perspective view of a ferrule and a flexible duct in accordance with embodiments of the present disclosure.

With continued reference to FIG. 1 and further reference to FIGS. 2 and 3, the fitting assembly 300 includes a ferrule 500 having a sidewall 510 which connects to a terminal end 204 of the flexible duct 200. With the flexible duct 200 connected to the ferrule 500, the ferrule shares and is coaxial with the longitudinal axis $L_D$ of the flexible duct 200. The sidewall 510 of the ferrule extends from a first end 512 of the ferrule 500 configured for insertion into the flexible duct 200 to a second end 514 of the ferrule 500 configured for connection to the fitting 400. The sidewall 510 has a radially increasing taper from the first end 512 of the ferrule 500 to the second end 514 of the ferrule 500, such that the sidewall 510 defines a minor diameter $D_{min}$ adjacent the first end 512 of the ferrule 500 and a major diameter $D_{maj}$ axially spaced apart from the minor diameter $D_{min}$ along the sidewall 510. The ferrule 500 thus forms a frustoconical structure between the minor and major diameters $D_{min}$, $D_{maj}$ thereof.

The ferrule 500 further includes at least one thread 520 extending radially from the sidewall 510. In some embodiments, the at least one thread 520 may extend for at least one revolution around the sidewall 510 of the ferrule 500. The at least one thread 520 is configured to engage the flexible duct 200 to retain the flexible duct 200 on the ferrule 500. The engagement of the ferrule 500 with the flexible duct 200 will now be described with reference to FIG. 4. As noted herein, the flexible duct 200 may be transitionable between a natural state, an elongated state, and a compressed state. More particularly, the helix structure 210 may be resilient such that radial and/or axial loading applied to the helix structure 210 induces the flexible duct 200 to assume either the elongated or compressed state, depending on the direction of the applied load. In the elongated state, the distance between adjacent windings of the helix structure 210 may be defined by an elongated pitch $P_E$, whereas, in the compressed state, the distance between adjacent windings of the helix structure 210 may be defined by a compressed pitch $P_C$ which is less than the elongated pitch $P_E$. An example of a radial load capable of inducing the compressed state is a load applied on the helix structure 210 by sliding the helix structure 210 over a conical structure having a greater diameter than the helix structure 210. This radial loading causes the individual windings of the helix structure 210 to expand in diameter and also causes the helix structure 210 to compress along the longitudinal axis $L_D$, thereby reducing the distance between adjacent windings relative to the elongated state. The helix structure 210 is resilient in that the helix structure 210 returns to the natural state upon removal of the load that induced the elongated or compressed state.

To engage the ferrule 500 with the terminal end 204 of the flexible duct 200, the helix structure 210 is threaded onto the at least one thread 520 of the ferrule 500 by rotating the flexible duct 200 relative to the ferrule, or vice versa. The helix structure 210 engages the at least one thread 520 to advance the flexible duct towards the second end 514 of the ferrule 500 as the flexible duct is rotated relative to the ferrule 500. More particularly, the at least one thread 520 engages and radially stretches the flexible sheet material 220 as the helix structure 210 rides along a shank 522 of the thread 520. The minor diameter $D_{min}$ of the sidewall 510 is less than an inner diameter of the flexible duct 200, such that the helix structure 210 fits around the first end 512 of the ferrule 500 without being radially deformed by the sidewall 510. The major diameter $D_{maj}$ of the sidewall 510 is greater than the inner diameter of the flexible duct 200, such that as the flexible duct 200 is threaded onto the ferrule 500 toward the second end 514, the sidewall 510 forces the helix structure 210 to radially expand. Consequently, a portion of the helix structure 210 forced to radially expand assumes the compressed state and the compressed pitch $P_C$, whereas a portion of the helix structure 210 that fits over the sidewall 510 without being radially deformed maintains the elongated state and the elongated pitch $P_E$. The flexible duct 200 may be threaded onto the ferrule 500 such that at least one revolution or winding of the helix structure 210 engages and is deformed by the sidewall 510 of the ferrule. Threading the flexible duct 200 onto the ferrule 500 may be performed by hand such that an installer can rapidly and securely assemble the ductwork assembly 1000 without the need for specialized tools or advanced training.

The radial load applied to the flexible duct 200 by the ferrule 500 results in an interference fit between the ferrule 500 and the flexible duct 200, causing the flexible duct 200 to be retained on the ferrule 500. In some embodiments, the interference fit may be sufficient to withstand an axial pullout force of 25 pounds. Thus, the interference fit between the ferrule 500 and the flexible duct 200 may be sufficient to secure the flexible duct 200 to the ferrule 500 in the completed, operational ductwork assembly 1000. In some embodiments, an adhesive may be applied between the flexible duct 200 and the ferrule 500 to assist in securing the flexible duct 200 to the ferrule 500. In some embodiments, the interface between the ferrule 500 and the flexible duct 200 is air tight, such that additional sealing components or materials such as clamps, fasteners, gaskets, mastics, and/or sealants need not be applied to the interface. In other embodiments, one or more of such sealing components or materials may be applied to the interface between the ferrule 500 and the flexible duct 200.

Figure 4:
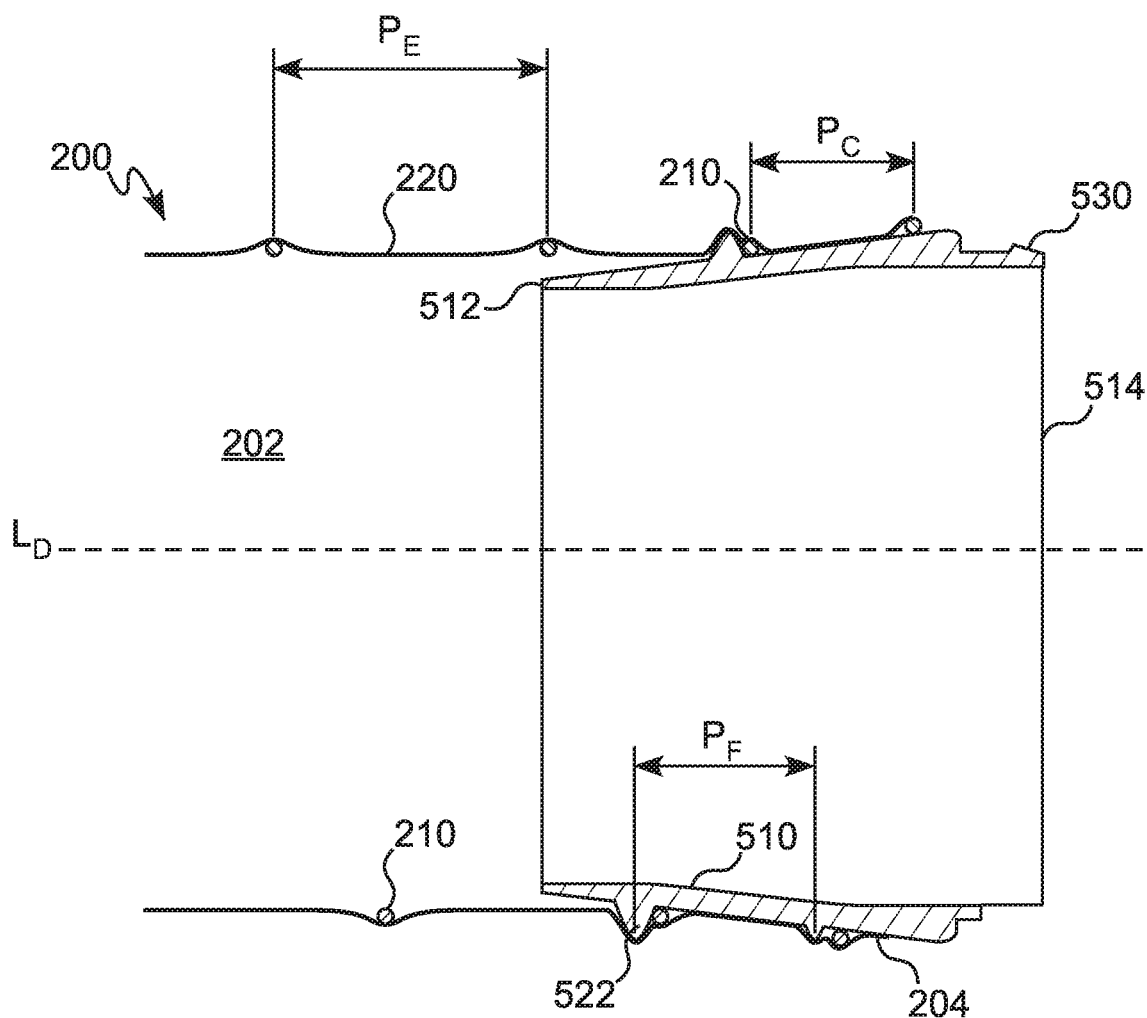
FIG. 4 is a side cross-sectional view of the ferrule and the flexible duct of FIG. 3.
Figure 5:
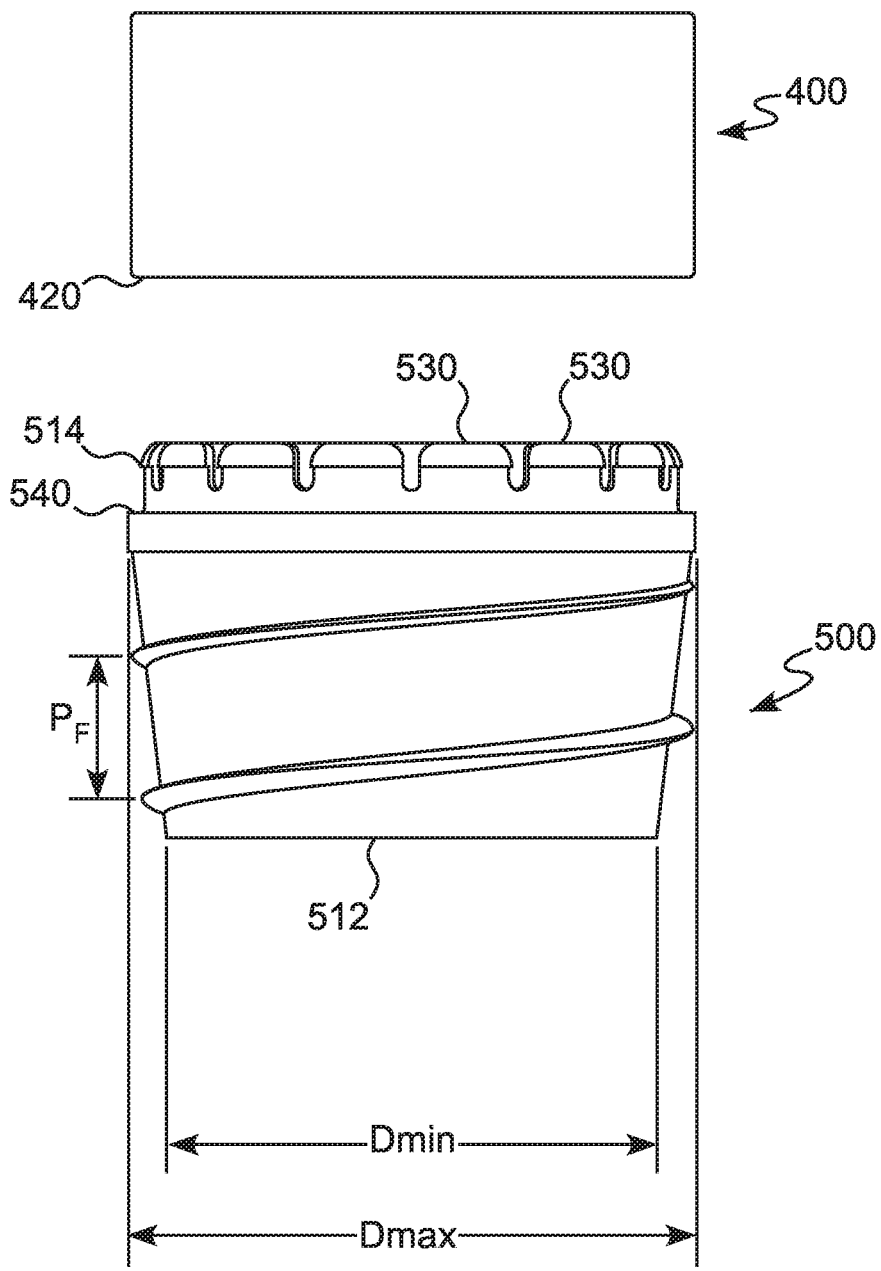
FIG. 5 is a side view of a fitting assembly in accordance with embodiments of the present disclosure.

With continued reference to FIGS. 2 and 4, a pitch $P_F$ defined by the spacing between adjacent windings of the at least one thread 520 of the ferrule 500 may be equal to or less than a pitch of the helix structure 210. In some embodiments, the pitch $P_F$ may be approximately equal to the compressed pitch $P_C$ of the helix structure 210, to facilitate a tight connection between the at least one thread 520 and the portion of the helix structure 210 in the compressed state. An outer diameter OD of the at least one thread 520 may be greater than the inner diameter of the flexible duct 200 with the flexible duct 200 installed on the ferrule 500. As such, the at least one thread 520 may engage the flexible duct 200 even in the vicinity of the minor diameter $D_{min}$ of the sidewall 510 where the sidewall 510 does not engage the flexible duct 200. In particular, the outer diameter OD may be larger than an inner diameter of the helix structure 210 when the pitch $P_F$ of the at least one thread 520 is equal to a compressed pitch $P_C$ with the helix structure 210 engaging the sidewall 510 of the ferrule 500. As such, the helix structure 210 is prevented from compressing further due to abutment of the helix structure with the at least one thread 520, thereby preventing radial expansion of the helix structure 210 and preventing the helix structure 210 from being able to jump the at least one thread 520.

In some embodiments, the outer diameter OD of the at least one thread 520 may be substantially constant along the length of the sidewall 510. In order that the outer diameter OD of the at least one thread 520 may be substantially constant despite the tapering of the sidewall 510, the flank 522 of the at least one thread 520 may be longer towards the first end 512 of the ferrule 500 and shorter towards the second end 514 of the ferrule 500.

In some embodiments, the at least one thread 520 may extend for at least one revolution, at least two revolutions, or more revolutions around the sidewall 510. In some embodiments, the flexible duct 200 may be threaded onto the ferrule 500 so as to engage the entirety of the at least one thread 520, while in other embodiments the flexible duct 200 may be threaded onto the ferrule 500 so as to engage only a portion of the at least one thread 520. The number of revolutions of the at least one thread, the outer diameter OD of the at least one thread, and the degree to which the flexible duct 200 engages the at least one thread 520 may be selected to achieve a desired pullout resistance of the ferrule 500. For example, the desired pullout resistance may be 25 pounds-force.

While the connection between the flexible duct 200 and the ferrule 500 has been described herein with reference to a flexible duct 200 including the helix structure 210, it is to be understood that the ferrule 500 may also be connected to a flexible duct 200 lacking a helix structure 210. In such embodiments, the at least one thread 520 of the ferrule 500 engages the flexible sheet material 220 to radially expand the flexible sheet material 220. Circumferential tension thereby generated in the flexible sheet material 220, along with friction between the flexible sheet material 220 and the sidewall 510, secure the flexible duct to the ferrule 500.

Figure 6:
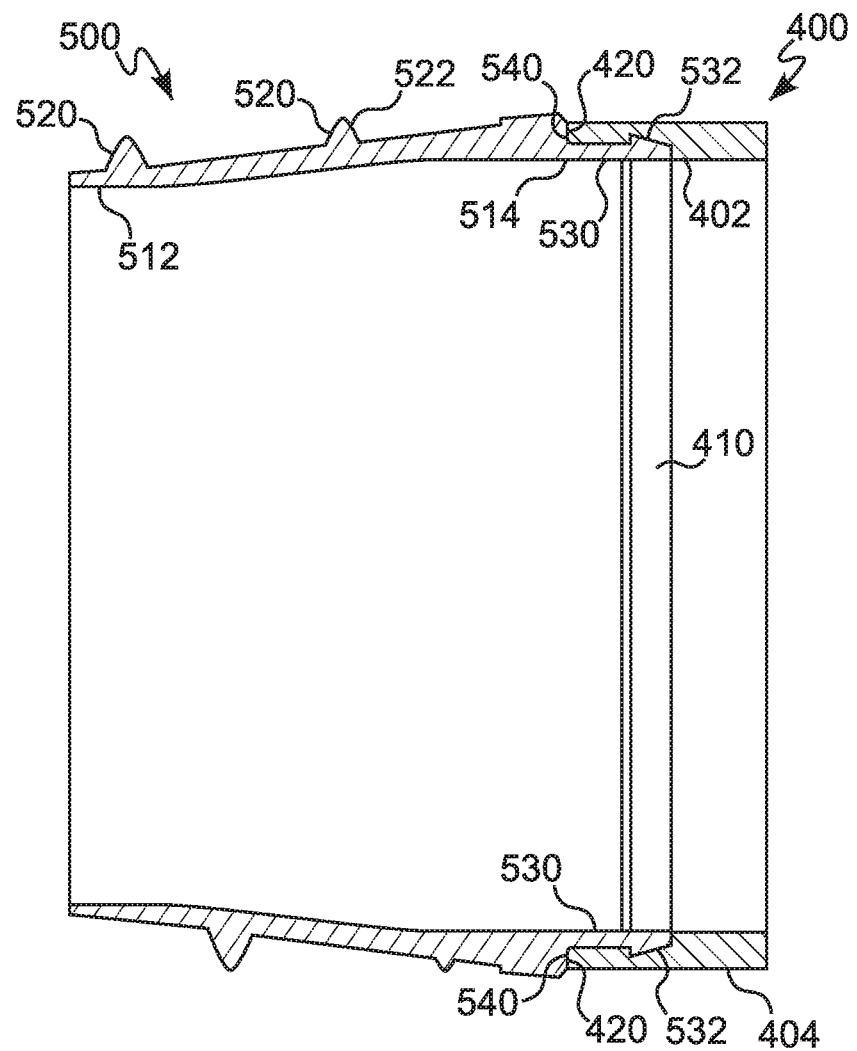
FIG. 6 is a cross-sectional side view of the fitting assembly of FIG. 5.

Referring now to FIGS. 1, 2, 5, and 6, the fitting assembly 300 may include a fitting 400 connected to the ferrule 500. The fitting 400 may be, or may include, any type of component of an HVAC system such as an elbow, a tee, a manifold takeoff, a coupling, a terminal boot, a cap, a plug, a union, or a flange. As shown in FIG. 6, the fitting 400 may define a groove or channel 410 for receiving one or more tabs 530 formed on and/or extending from the second end 514 of the ferrule 500. Each tab 530 of the ferrule 500 may be radially deflectable and may include a projection 532 that snaps into the groove 410 of the fitting. In some embodiments, the one or more tabs 530 may be evenly spaced around the circumference of the ferrule 500. In some embodiments, the groove 410 may extend uniformly around the entire circumference of the fitting 400 to allow continuous rotation of the ferrule 500 relative to the fitting 400. The snap fit between the fitting 400 and the ferrule 500 allows the connection of the fitting 400 and the ferrule 500 to be performed by hand so that the installer can rapidly and securely assemble the fitting assembly 300 without the need for specialized tools or advanced training.

The ferrule 500 may include or define a shoulder 540 which abuts an end 420 of the fitting 400 when the ferrule 500 is connected to the fitting 400. In some embodiments, the interface between the shoulder 540 of the ferrule 500 and the end 420 of the fitting 400 defines an air tight connection which eliminates the need for additional sealing components or materials such as clamps, fasteners, gaskets, mastics, and/or sealants. In other embodiments, one or more of such sealing components or materials may be applied to the interface between the ferrule 500 and the fitting 400.

As shown in the accompanying drawings, the groove 410 may be defined in an internal surface 402 of the fitting 400, and the projections 532 of the one or more tabs 530 may extend radially outward to engage the groove 410. In other embodiments, the groove 410 may be defined in an external surface 404 of the fitting 400, and the projections 532 of the one or more tabs 530 may extend radially inward to engage the groove 410. In yet other embodiments, the groove 410 may be provided on the ferrule 500, and the one or more tabs 530 may be provided on the fitting 400. The connection of the groove 410 and the one or more tabs 532 may be sufficiently strong to withstand a desired axial separating force, for example 25 pounds, applied to the fitting 400 and the ferrule 500.

In some embodiments, the one or more tabs 532 may removeably snap into the groove 410 to allow disassembly and reassembly of the fitting assembly 300 and reuse of the fitting 400 and the ferrule 500. In other embodiments, the one or more tabs 530 may permanently attach to the groove 410 to prevent disassembly of the fitting assembly 300. In some embodiments, an adhesive may be applied to the interface between the one or more tabs 530 and the groove 410 to permanently connect the fitting 400 to the ferrule 500. In still other embodiments, the fitting assembly 300, including the fitting 400 and the ferrule 500, may be integrally formed as a single, unitary component.

Referring again to FIGS. 1-6, the components of the ductwork assembly 1000, including the flexible duct 200, the fitting 400, and the ferrule 500, may be manufactured from materials that are generally heat insulators to maintain the temperature of air conveyed through the ductwork assembly 1000. The helix structure 210 of the flexible duct 200 may be manufactured from steel or a similar resilient, shape memory material capable of supporting the shape of the flexible sheet material 220 and able to withstand deformation as the flexible duct 200 is connected to the ferrule 500. The flexible sheet material 220 may be manufactured from a resilient material, such as a thin-wall polyvinyl chloride (PVC) or polyurethane foam, so that the flexible sheet material 220 can deform against the at least one thread 520 and the sidewall of the ferrule 500. The flexible sheet material 220 may have a thickness, for example, of less than 0.25 inches or of less than 0.5 inches. The fitting 400 and the ferrule 500 may be manufactured from one or more materials including but not limited to: plastic, such as PVC or acrylonitrile butadiene styrene (ABS); composite materials such as a fiber-reinforced polymer; metal; or non-combustible material.

Sizing of the components of the ductwork assembly 1000 may be selected based on the desired air flow rate within the ductwork assembly 1000. The flexible duct 200 is typically manufactured in a variety of nominal sizes that dictate the sizing of the fitting 400 and the ferrule 500. In particular, the major and minor diameters $D_{maj}$, $D_{min}$ of the ferrule 500 may be based on the diameter of the flexible duct 200 to facilitate proper engagement of the ferrule 500 and the flexible duct 200, as discussed herein with reference to FIG. 4. In some embodiments, the major diameter $D_{maj}$ may be in a range of 1 percent to 20 percent greater than the inner diameter of the flexible duct 200. In some embodiments, the minor diameter $D_{min}$ may be in a range of 0 percent to 20 percent less than the inner diameter of the flexible duct 200. In some embodiments, the taper of the sidewall 510 between the major and minor diameters $D_{maj}$, $D_{min}$ of the ferrule 500 may be in the range of 0.5 to 15 degrees. In some embodiments, the maximum height of the at least one thread 520 of the ferrule 500 may be in the range of 2 millimeters (mm) and 6 mm. In some embodiments, the length of the sidewall 510 between the major and minor diameters $D_{maj}$, $D_{min}$ of the ferrule 500 may be in the range of 35 mm to 80 mm. In some embodiments, the pitch $P_F$ of the at least one thread 520 of the ferrule 500 may be in the range of 13 mm to 36 mm. It is to be understood that the foregoing values and ranges of values for sizing the components of the ductwork assembly 1000 are presented only for exemplary purposes and are not to be construed as limiting.

The present disclosure is further directed to a method of assembling the ductwork assembly 1000. The manner in which the flexible duct 200, the fitting 400, and the ferrule 500 are connected to one another is generally described herein in the context of the structural features of the various components. In particular, connection of the flexible duct 200 to the ferrule 500 is described in connection with at least FIG. 4, and connection of the fitting 400 and the ferrule 500 is described herein in connection with at least FIG. 6. A method of assembling the ductwork assembly 1000 may include connecting the flexible duct 200 to the ferrule 500, and connecting the ferrule 500 to the fitting 400. The method may further include repeatedly making connections of additional flexible ducts 200, fittings 400, and ferrules 500 until the entire ductwork assembly 1000 is completed. For example, the method may include repeatedly making connections of additional flexible ducts 200, fittings 400, and ferrules 500 to achieve an HVAC as generally described in International Patent Application Publication No. WO 2018/004768, the disclosure of which is hereby incorporated by reference in its entirety. In general, the order of making the connections does not matter due to the rotatable nature of the ferrule 500 relative to the fitting 400. However, the specific layout of the ductwork assembly 1000 may be more conducive to connecting the ferrule 500 to the flexible tubing 200 prior to connecting the ferrule to the fitting 400, or vice versa. Additionally, in embodiments in which the fitting 400 is not rotatable relative to the ferrule 500 after connection is made, it may be necessary to connect the ferrules 500 at both terminal ends 204 of the flexible tube 200 prior to connecting the ferrules 500 to the fittings 400. Otherwise, threading the flexible duct 200 onto the second ferrule 500 may cause the flexible duct 200 to be unthreaded from the first ferrule 500.

While several embodiments of a fitting assembly, a ferrule, and a ductwork assembly are shown in the accompanying figures and described hereinabove in detail, other embodiments will be apparent to, and readily made by, those skilled in the art without departing from the scope and spirit of the invention. For example, it is to be understood that this disclosure contemplates, to the extent possible, that one or more features of any embodiment can be combined with one or more features of any other embodiment. Accordingly, the foregoing description is intended to be illustrative rather than restrictive.

What is claimed is:

1. A fitting assembly for connection to a flexible duct, the fitting assembly comprising:
    a fitting; and
    a ferrule extending from the fitting, the ferrule comprising:
        a first end configured for insertion into an open end of the flexible duct;
        a second end adjacent to the fitting;
        a sidewall extending between the first end and the second end, the sidewall defining a minor diameter adjacent the first end and a major diameter spaced apart from the minor diameter; and
        a ferrule thread extending radially outward from the sidewall,
    wherein the minor diameter is less than or equal to an inner diameter of the flexible duct with the flexible duct in an untensioned state,
    wherein the major diameter is greater than the inner diameter of the flexible duct with the flexible duct fully elongated,
    wherein the ferrule is continuously rotatable relative to the fitting,
    wherein an annular groove extends uniformly around an entire circumference of an internal surface of the fitting, and the ferrule comprises at least one deflectable tab at the second end of the ferrule configured to engage the groove to removeably connect the fitting to the ferrule, in which the at least one deflectable tab comprises a projection extending radially outward to snap into the annular groove, and
    wherein the ferrule comprises a shoulder disposed offset from the second end of the ferrule and defining an outermost diameter of the ferrule that abuts an end of the fitting when the ferrule is connected to the fitting to form an airtight connection at an interface between the shoulder of the ferrule and the end of the fitting.

2. The fitting assembly according to claim 1, wherein the ferrule is removeably connected to the fitting.

3. The fitting assembly according to claim 1, wherein a taper of the sidewall of the ferrule is configured to stretch a sheet material of the flexible duct as the ferrule is threaded into the flexible duct.

4. The fitting assembly according to claim 1, wherein a pitch of the ferrule thread is less than or equal to a pitch of a helix structure of the flexible duct with the flexible duct fully elongated.

5. The fitting assembly according to claim 1, wherein an outer diameter of the ferrule thread is larger than an inner diameter of a helix structure of the flexible duct when a pitch of the ferrule thread is equal to a pitch of the helix structure.

6. The fitting assembly according to claim 1, wherein the length of the sidewall between the major diameter and the minor diameter is sufficient for the ferrule to engage at least one revolution of a helix structure of the flexible duct.

7. The fitting assembly according to claim 1, wherein the connection between the fitting and the ferrule is substantially air tight without application of a sealant material.

8. The fitting assembly according to claim 1, further comprising a gasket or sealant material disposed at an interface of the fitting and the ferrule.

9. The fitting assembly according to claim 1, wherein the ferrule thread comprises at least one full revolution around the sidewall of the ferrule.

10. The fitting assembly according to claim 1, wherein the fitting comprises at least one of an elbow, a tee, a wye, a manifold takeoff, a coupling, a terminal boot, a cap, a plug, a union, and a flange.

11. A method of assembling ductwork comprising:
providing a duct having a helix structure and a flexible sheet material surrounding the helix structure;
providing a ferrule having a sidewall extending between a first end and a second end, and a ferrule thread extending radially outward from the sidewall, the sidewall defining a minor diameter adjacent the first end and a major diameter spaced apart from the minor diameter, wherein the minor diameter is less than or equal to an inner diameter of the duct and wherein the major diameter is greater than the inner diameter of the duct;
threading the helix structure of the duct over the ferrule thread such that the flexible sheet material of the duct is stretched radially outward by the sidewall of the ferrule, and
connecting a fitting to the second end of the ferrule,
wherein the ferrule is continuously rotatable relative to the fitting,
wherein an annular groove extends uniformly around an entire circumference of an internal surface of the fitting, and the ferrule comprises at least one deflectable tab at the second end of the ferrule configured to engage the groove to removeably connect the fitting to the ferrule, in which the at least one deflectable tab comprises a projection extending radially outward to snap into the annular groove, and
wherein the ferrule comprises a shoulder disposed offset from the second end of the ferrule and defining an outermost diameter of the ferrule that abuts an end of the fitting when the ferrule is connected to the fitting to form an airtight connection at an interface between the shoulder of the ferrule and the end of the fitting.

12. The method according to claim 11, wherein threading the helix structure of the duct over the ferrule shortens a pitch of the helix structure.

* * * * *